(12) United States Patent
Washington et al.

(10) Patent No.: US 7,885,891 B1
(45) Date of Patent: Feb. 8, 2011

(54) PORTAL TOOL AND METHOD FOR SECURITIZING EXCESS SERVICING FEES

(75) Inventors: Juoaquina L. Washington, Washington, DC (US); Leslie G. Beatey, Forest, VA (US); Robert L. Brown, Reston, VA (US); Azfar S. Abbasi, Vienna, VA (US); Arthur A. Johnson, Washington, DC (US); Kevin J. Tock, Silver Spring, MD (US); Robert A. Wright, Keedysville, MD (US); Theodore N. Dacy, Silver Spring, MD (US); Matthew Q. Jackson, Gaithersburg, MD (US)

(73) Assignee: Fannie Mae, Washington, DC (US)

(*) Notice: Subject to any disclaimer, the term of this patent is extended or adjusted under 35 U.S.C. 154(b) by 296 days.

(21) Appl. No.: 12/026,422

(22) Filed: Feb. 5, 2008

Related U.S. Application Data

(63) Continuation-in-part of application No. 11/726,364, filed on Mar. 21, 2007, now abandoned.

(60) Provisional application No. 60/889,210, filed on Feb. 9, 2007, provisional application No. 60/784,726, filed on Mar. 22, 2006.

(51) Int. Cl.
*G06Q 40/00* (2006.01)
(52) U.S. Cl. .......................................... 705/38
(58) Field of Classification Search ................ 705/38
See application file for complete search history.

(56) References Cited

U.S. PATENT DOCUMENTS

| | | | |
|---|---|---|---|
| 4,876,648 A | 10/1989 | Lloyd | |
| 5,557,517 A | 9/1996 | Daughterty, III | |
| 5,563,783 A | 10/1996 | Stolfo et al. | |
| 5,692,233 A | 11/1997 | Garman | |
| 5,806,048 A | 9/1998 | Kiron et al. | |
| 5,946,667 A | 8/1999 | Tull, Jr. et al. | |
| 5,983,206 A | 11/1999 | Oppenheimer | |
| 6,070,151 A | 5/2000 | Frankel | |

(Continued)

FOREIGN PATENT DOCUMENTS

WO WO 0116819 3/2001

(Continued)

OTHER PUBLICATIONS

An Investor's Guide to Pass-Through and Collateralized Mortgage Securities, 1997, 12 pages.

(Continued)

*Primary Examiner*—Hani Kazimi
*Assistant Examiner*—Clifford Madamba
(74) *Attorney, Agent, or Firm*—Foley & Lardner LLP

(57) ABSTRACT

A communication portal configured to provide information regarding mortgage backed securities that have incoming cash flows backed by the excess servicing fees of the plurality of adjustable rate mortgages is described. The communication portal may be configured to display a user prompt to receive information regarding the excess servicing fees and reports regarding the mortgage backed securities that have incoming cash flows backed by the excess servicing fees of the plurality of adjustable rate mortgages. The communication portal can be accessible online.

20 Claims, 22 Drawing Sheets

U.S. PATENT DOCUMENTS

| | | | |
|---|---|---|---|
| 6,088,685 | A | 7/2000 | Kiron et al. |
| 6,249,775 | B1 | 6/2001 | Freeman et al. |
| 6,263,321 | B1 | 7/2001 | Daughtery, III |
| 6,304,858 | B1 | 10/2001 | Mosler et al. |
| 6,321,212 | B1 | 11/2001 | Lange |
| 6,381,586 | B1 | 4/2002 | Glasserman et al. |
| 6,460,021 | B1 | 10/2002 | Kirksey |
| 6,546,375 | B1 | 4/2003 | Pang et al. |
| 6,778,968 | B1 | 8/2004 | Gulati |
| 6,988,082 | B1 | 1/2006 | Williams et al. |
| 6,999,942 | B2 | 2/2006 | Kemper et al. |
| 2001/0025264 | A1 | 9/2001 | Deaddio et al. |
| 2001/0044762 | A1 | 11/2001 | Nault |
| 2002/0019805 | A1 | 2/2002 | Kalotay |
| 2002/0035530 | A1 | 3/2002 | Ervolini et al. |
| 2002/0055897 | A1 | 5/2002 | Shidler et al. |
| 2002/0055905 | A1 | 5/2002 | Jannah et al. |
| 2002/0065755 | A1 | 5/2002 | Shlafman et al. |
| 2002/0082852 | A1 | 6/2002 | Greene et al. |
| 2002/0087373 | A1 | 7/2002 | Dickstein et al. |
| 2002/0103667 | A1 | 8/2002 | Jannah et al. |
| 2002/0103738 | A1 | 8/2002 | Griebel et al. |
| 2002/0107774 | A1 | 8/2002 | Henninger et al. |
| 2002/0116317 | A1 | 8/2002 | May |
| 2002/0133456 | A1 | 9/2002 | Lancaster et al. |
| 2002/0138299 | A1 | 9/2002 | Nations |
| 2002/0156719 | A1 | 10/2002 | Finebaum et al. |
| 2002/0178101 | A1 | 11/2002 | Swift |
| 2003/0009404 | A2 | 1/2003 | Kiron et al. |
| 2003/0009405 | A2 | 1/2003 | Kiron et al. |
| 2003/0014355 | A1 | 1/2003 | Browne et al. |
| 2003/0018570 | A1 | 1/2003 | McCabe et al. |
| 2003/0028468 | A1 | 2/2003 | Wong et al. |
| 2003/0033225 | A1 | 2/2003 | Meldahl |
| 2003/0061148 | A1 | 3/2003 | Alavian |
| 2003/0074293 | A1 | 4/2003 | Kiron et al. |
| 2003/0074306 | A1 | 4/2003 | Rios et al. |
| 2003/0083978 | A1 | 5/2003 | Brouwer |
| 2003/0101120 | A1 | 5/2003 | Tilton |
| 2003/0103188 | A1 | 6/2003 | Zeltzer |
| 2003/0105696 | A1 | 6/2003 | Kalotay et al. |
| 2003/0105708 | A1 | 6/2003 | Lee |
| 2003/0110045 | A1 | 6/2003 | Kehrli et al. |
| 2003/0115128 | A1 | 6/2003 | Lange et al. |
| 2003/0135451 | A1 | 7/2003 | O'Brien et al. |
| 2003/0144947 | A1 | 7/2003 | Payne |
| 2003/0144950 | A1 | 7/2003 | O'Brien et al. |
| 2003/0154153 | A1 | 8/2003 | Steidlmayer et al. |
| 2003/0163414 | A1 | 8/2003 | O'Brien et al. |
| 2003/0208430 | A1 | 11/2003 | Gershon |
| 2003/0220861 | A1 | 11/2003 | Broms et al. |
| 2004/0006528 | A1 | 1/2004 | Fung |
| 2004/0044613 | A1 | 3/2004 | Murakami et al. |
| 2004/0059651 | A1 | 3/2004 | MaGuire, III et al. |
| 2004/0064331 | A1 | 4/2004 | Mayer et al. |
| 2004/0064392 | A1 | 4/2004 | Barkman, Jr. |
| 2004/0064393 | A1 | 4/2004 | Luenberger |
| 2004/0083158 | A1 | 4/2004 | Addison et al. |
| 2004/0098327 | A1 | 5/2004 | Seaman |
| 2004/0098329 | A1 | 5/2004 | Tilton |
| 2004/0111342 | A1 | 6/2004 | Wang |
| 2004/0128149 | A1 | 7/2004 | Kemper et al. |
| 2004/0138977 | A1 | 7/2004 | Tomkins et al. |
| 2004/0143528 | A1 | 7/2004 | Spieler et al. |
| 2004/0148239 | A1 | 7/2004 | Albee et al. |
| 2004/0148240 | A1 | 7/2004 | Gulati et al. |
| 2004/0153384 | A1 | 8/2004 | Whipple et al. |
| 2004/0158515 | A1 | 8/2004 | Schoen |
| 2004/0158520 | A1 | 8/2004 | Noh |
| 2004/0167812 | A1 | 8/2004 | Haney, II |
| 2004/0167848 | A1 | 8/2004 | Agarwal et al. |
| 2004/0172356 | A1 | 9/2004 | Agarwal et al. |
| 2004/0220872 | A1 | 11/2004 | Pollock, II |
| 2005/0021434 | A1 | 1/2005 | D'Loren |
| 2005/0027634 | A1 | 2/2005 | Gershon |
| 2005/0044019 | A1 | 2/2005 | Novick et al. |
| 2005/0065865 | A1 | 3/2005 | Salomon et al. |
| 2005/0065941 | A1 | 3/2005 | DeAngelis et al. |
| 2005/0075960 | A1 | 4/2005 | Leavitt et al. |
| 2005/0075961 | A1 | 4/2005 | McGill |
| 2005/0086148 | A1 | 4/2005 | Woodruff et al. |
| 2005/0102204 | A1 | 5/2005 | Kataoka |
| 2005/0102225 | A1* | 5/2005 | Oppenheimer et al. ........ 705/38 |
| 2005/0119962 | A1 | 6/2005 | Bowen et al. |
| 2005/0125318 | A1 | 6/2005 | Jameson |
| 2005/0131789 | A1 | 6/2005 | Mintz |
| 2005/0131796 | A1 | 6/2005 | Bridges et al. |
| 2005/0165668 | A1 | 7/2005 | Hinkle |
| 2005/0177485 | A1 | 8/2005 | Peter |
| 2005/0192875 | A1 | 9/2005 | White et al. |
| 2005/0197931 | A1 | 9/2005 | Gupta |
| 2005/0197952 | A1 | 9/2005 | Shea et al. |
| 2005/0203839 | A1* | 9/2005 | Dowell et al. ................. 705/39 |
| 2005/0203972 | A1 | 9/2005 | Cochran et al. |
| 2005/0209876 | A1 | 9/2005 | Kennis et al. |
| 2005/0209899 | A1 | 9/2005 | King et al. |
| 2005/0216399 | A1 | 9/2005 | Colvin |
| 2005/0222928 | A1 | 10/2005 | Steier et al. |
| 2005/0222929 | A1 | 10/2005 | Steier et al. |
| 2005/0222940 | A1 | 10/2005 | Schulman |

FOREIGN PATENT DOCUMENTS

| | | |
|---|---|---|
| WO | WO 0152121 | 7/2001 |
| WO | WO 0237367 | 5/2002 |
| WO | WO 0244847 | 6/2002 |
| WO | WO 03034297 | 4/2003 |
| WO | WO 2004066101 | 8/2004 |
| WO | WO 2004066102 | 8/2004 |
| WO | WO 2004072778 | 8/2004 |

OTHER PUBLICATIONS

Fannie Mae Launches Benchmark REMIC(TM) Issuance, Newswire article, Jun. 16, 2006, 2 pages.

Fannie Mae Prices $2.0 billion of Benchmark REMIC Trust 2006—B1, Fannie Mae News Release, Jun. 20, 2006, 2 pages.

Fannie Mae Prospectus Supplement, Fannie Mae Guaranteed REMIC Pass-Through Certificates Fannie Mae Benchmark REMIC Trust 200—B1, Jun. 20, 2006, 60 pages.

Hu, Joseph, Ph. D., *Basics of Mortage-Backed Securities*, Second Edition, © 2001 by Frank J. Fabozzi Associates, New Hope, Pennsylvania, 175 pages.

Recent Tax Developments Affecting Securitizations, McKee Nelson, Oct. 11, 2004, 4 pages.

Single-Family MBS Prospectus; Fannie Mae®, Guaranteed Mortgage Pass-through Certificates (Single-Family Residential Mortgage Loans), May 1, 2002, 46 pages.

Single-Family REMIC Prospectus, Fannie Mae®, Guaranteed REMIC Pass-Through Certificates, May 1, 2002, 57 pages.

Fannie Mae Announces Additional Enhancements for Mortgage-Backed Securities Disclosures, Fannie Mae News Release, Oct. 27, 2004, 2 pages.

Fannie Mae Fulfills Commitment to Provide Additional Information on Existing Mortgage-Backed Securities, Fannie Mae News Release, Jun. 12, 2003, 2 pages.

MBSenger, Updating the Investment Community on Fannie Mae Mortgage Products and Programs, Jun. 2006, vol. 1 No. 2, 2 pages.

Freddie Mac; Focus on: Guaranteed Maturity Securities (GMS), believed to be available at least by Mar. 21, 2007, 2 pages.

Freddie Mac, Reference REMIC Series R003, Jun. 1, 2003, 94 pages.

Freddie Mac, Multiclass Certificates, REMIC Certificates, MACR Certificates, Jun. 1, 2003, 68 pages.

Federal Home Loan Mortgage Corporation, Multiclass Certificates Agreement, Jun. 1, 2003, 22 pages.

* cited by examiner

MONTHLY DISCLOSURE (420)

- INDEXES
- RATE ADJUSTMENT FREQUENCY
- PAYMENT ADJUSTMENT FREQUENCY
- LOOKBACK
- DEFERRED INTEREST ALLOWED
- PAYMENT CAP
- SUBTYPES
- PREPAYMENT INFORMATION (% OF UPB BY SUBTYPE??)
- FIRST RATE CHANGE DATE
- CONVERTIBILITY
- AMORTIZATION RECAST FREQUENCY
- ESTIMATED ACCRUAL RATE
- ORIGINAL ACCRUAL RATE
- ACCRUAL RATE STRUCTURE
- MINIMUM INDEX MOVEMENT
- PAYING RATE (COUPON)
- FIRST PAYMENT CHANGE DATE
- TRANSFER TYPE
- RATE DIFFERENCE FLAG
- WEIGHTED AVG. MBS MARGIN
- WEIGHTED AVG. LOAN MARGIN
- WEIGHTED AVG. NET LIFE CAP
- WEIGHTED AVG. NET LIFE FLOOR
- WEIGHTED AVG. PER ADJUSTMENT CAP
- WEIGHTED AVG. PER ADJUSTMENT FLOOR
- WEIGHTED AVG. NEG AM LIMIT
- ORIGINAL WAC
- CURRENT WAC
- WEIGHTED AVG. MONTHS TO NEXT RATE CHANGE
- MINIMUM & QUARTILE VALUES FOR:
  - ○ WAC   ○ CEILING   ○ PTR
  - ○ WAM   ○ MBS MARGIN
  - ○ LOAN SIZE   ○ FLOOR
  - ○ LOAN TERM   ○ WEIGHTED AVG. LOAN AGE
- LOW & HIGH VALUES FOR:
  - ○ MBS MARGIN
  - ○ ACCRUAL NET CAP
  - ○ NET LIFE CAP
  - ○ NET LIFE FLOOR
  - ○ INTEREST RATE
- BY 1ST PAYMENT CHANGE DATE:
  - ○ ORIGINAL NOTE RATE
  - ○ PERCENT OF BALANCE
  - ○ LOAN COUNT
- ORIGINAL LTV
- CREDIT SCORE
- LOAN PURPOSE
- OCCUPANCY TYPE
- PROJECT TYPE
- SERVICER NAME

*Fig. 4C*

| WEIGHTED-AVERAGE MBS MARGIN | | | | | | | |
|---|---|---|---|---|---|---|---|
| | UPB | LOAN MARGIN | G-FEE | S-FEE | MBS MARGIN | EXCESS S-FEE (S-FEE - 37.5BPS) |
| LOAN A | $ 175,000.00 | 2.25% | 0.35% | 0.500% | 1.400% | 0.125% |
| LOAN B | $ 175,000.00 | 2.50% | 0.35% | 0.500% | 1.650% | 0.125% |
| LOAN C | $ 150,000.00 | 2.75% | 0.35% | 0.500% | 1.900% | 0.125% |
| POOL WTD AVERAGE | $ 500,000.00 | 2.488% | 0.35% | 0.500% | 1.638% | 0.125% |

| FIXED-AVERAGE MBS MARGIN | | | | | | | |
|---|---|---|---|---|---|---|---|
| | UPB | LOAN MARGIN | G-FEE | S-FEE | MBS MARGIN | EXCESS S-FEE (S-FEE - 37.5BPS) |
| LOAN D | $ 175,000.00 | 2.50% | 0.35% | 0.525% | 1.625% | 0.15% |
| LOAN E | $ 175,000.00 | 2.75% | 0.35% | 0.775% | 1.625% | 0.40% |
| LOAN F | $ 150,000.00 | 3.00% | 0.35% | 1.025% | 1.625% | 0.65% |
| POOL WTD AVERAGE | $ 500,000.00 | 2.738% | 0.35% | 0.763% | 1.625% | 0.39% |

| COMMINGLED POOLING STRUCTURES | | EXCESS AVAILABLE | CLASS 1 | CLASS 2 | CLASS 3 | WAC CLASS | EXCESS USED | ELIGIBLE LOAN? |
|---|---|---|---|---|---|---|---|---|
| WEIGHTED STRUCTURE, WEIGHTED MARGIN POOL | LOAN A | 0.125 | 0.125 | - | - | - | 100% | YES |
| | LOAN B | 0.125 | 0.125 | - | - | - | 100% | YES |
| | LOAN C | 0.125 | 0.125 | - | - | - | 100% | YES |
| WEIGHTED STRUCTURE, FIXED MARGIN POOL | LOAN D | 0.15 | 0.125 | 0.025 | - | - | 100% | YES |
| | LOAN E | 0.40 | 0.125 | 0.025 | 0.025 | - | 100% | YES |
| | LOAN F | 0.65 | 0.125 | 0.025 | 0.025 | 0.125 | 100% | YES |

Fig. 7

Excess Servicing Securitization

| Home | New Deal |

Deal Processing Status

Announcements

Welcome to the Excess servicing Reconciliation System. This system can be used to submit new deal requests. The system is currently unavailable for submitting new deal request. it will be available on November 1st at 2:00. We apologize for this inconvenience.

| Activity | Pending | Created |

Recent Submissions

| ID | Type | Status | Loan Count | Discrepancies | | Last Updated |
|---|---|---|---|---|---|---|
| 102 | Fixed | requested | 323,231 | | | 07/13/2006 07:00 PM |
| 104 | ARM | Rejected | 77,527 | 3203 Loan did not match expected values | | 07/13/2006 07:00 PM |

1110    1112

©2004-2008 All Rights Reserved. (Index) (Home)

*Fig. 11*

Excess Servicing Securitization

| Home | New Deal |

Deal Processing Status

Announcements

Welcome to the Excess servicing Reconciliation System. This system can be used to submit new deal requests. The system is currently unavailable for submitting new deal request. it will be available on November 1st at 2:00. We apologize for this inconvenience.

| Activity | Pending | Created |

All Created Workflows

Filter | Reset    Records: Search Results: 500  Filter Results: 500  Show 10  Per Page | Pages: 1 2 3 4 5 6 Next Last

| Lender | ID | Deal Number | Type | State | Settlement Month | Loan Count | Excess Fee Amount | Loan Level Discrepancy | Pseudo Pool Reconciliation | Excess Fee Reconciliation |
|---|---|---|---|---|---|---|---|---|---|---|
| Countrywide | 1 | | ARM | Requested | 08/2006 | 123,134 | $323,323,342.00 | 0 | 0 | 0 |
| Countrywide | 2 | | Fixed | Submitted | 08/2006 | 99,322 | $32,756.43 | 0 | 0 | 0 |
| World Savings | 3 | TR00305 | Fixed | Approved | 08/2006 | 462,321 | $766,234,456.32 | 0 | 0 | 0 |
| Wachovia | 4 | | ARM | Rejected | 08/2006 | 88,434 | $234,456.87 | 342 | 2 | 0 |
| Bank of America | 5 | | External | Rejected | 08/2006 | 402,392 | $987,345,345.84 | 0 | 0 | 0 |

©2004-2008 All Rights Reserved. (Index) (Home)

*Fig. 12*

Excess Servicing Securitization

| Home | Reports | Admin |

Workflow Detail

Requested 〉 Submitted 〉 Failed Reconciliation 〉 Preliminary Reconciliation 〉 Final Reconciliation 〉 Statements Created 〉 Deal Created 〉 Active 〉 Completed (Rejected)

Workflow Details

Lender:

| | Deal ID: | Type: | Settlement Date | Loan Count | Excess Servicing Fee |
|---|---|---|---|---|---|
| Countrywide Home Loans — 1312 | 1 | ARM | 07/01/2006 | 323,323 | $234,234,675.04 — 1310 |
| Loan Level Discrepancies — 1314 | 0 | | | | |
| Pseudo Pool Reconciliation — 1316 | 0 | | | | |
| Excess Fee Discrepancy | $323,433.32 | | | | |

Submit | Edit | Create Deal | Create PDS | Cancel

| Detail | Lenders | Files | Loans | Reports | Commingling | Monthly | PDS | Activity | Next Rate | Comments | Geo | Rules |

Targeted Servicer Numbers

Filter [ ▼ ] Reset    Records: Search Results: 500  Filter Results: 500  Show [ 10 ▼ ] Per Page | Pages: 1 2 3 4 5 6 Next Last

| Servicer Number | Servicer Name |
|---|---|
| 10212-123-1 | Countrywide |
| 10212-322-1 | Countrywide |
| 93423-122-1 | World Savings |
| 93423-122-1 | Wachovia |
| 67566-842-1 | Bank of America |

Excess Servicing Securitization

| Home | Reports | Admin |

Workflow Detail

Requested 〉 Submitted 〉 Failed Reconciliation 〉 Preliminary Reconciliation 〉 Final Reconciliation 〉 Statements Created 〉 Deal Created 〉 Active 〉 Completed (Rejected)

Workflow Details

| Lender: | Deal ID: | Type: | Settlement Date | Loan Count | Excess Servicing Fee |
|---|---|---|---|---|---|
| Countrywide Home Loans | 1 | ARM | 07/01/2006 | 323,323 | $234,234,675.04 |
| Loan Level Discrepancies | 0 | | | | |
| Pseudo Pool Reconciliation | 0 | | | | |
| Excess Fee Discrepancy | $323,433.32 | | | | |

Re-upload data files

▽ Target Service Numbers
[......] [Browse]

▽ Loan Level Detail
[ ] [Browse]

▽ Allocation Files
[ ] [Browse]

[Submit] [Cancel]

Excess Servicing Securitization

| Home | Reports | Admin |

Workflow Detail

Requested 〉 Submitted 〉 Failed Reconciliation 〉 Preliminary Reconciliation 〉 Final Reconciliation 〉 Statements Created 〉 Deal Created 〉 Active 〉 Completed (Rejected)

Workflow Details

| Lender: | Deal ID: | Type: | Settlement Date | Loan Count | Excess Servicing Fee |
|---|---|---|---|---|---|
| Countrywide Home Loans | 1 | ARM | 07/01/2006 | 323,323 | $234,234,675.04 |
| Loan Level Discrepancies | 0 | | | | |
| Pseudo Pool Reconciliation | 0 | | | | |
| Excess Fee Discrepancy | $323,433.32 | | | | |

Submit | Edit | Create Deal | Create PDS | Cancel

— 1610

| Detail | Files | Reports | Monthly | Activity | Comments | Rules |

Posted Reports

| File Type | File Name | Date Created |
|---|---|---|
| Matching Loans | match_wfrq060913b.cvs | 07/01/2006 09:52 AM |
| Non-matchuing Loans | nonmatch_wfrq060913b.cvs | 07/01/2006 02:14 AM |
| Reconciliation Report | Report.pdf | 07/01/2006 12:33 PM |
| Loan Level Draft Report | | |

*Fig. 16*

Excess Servicing Securitization

| Home | Reports | Admin |

Workflow Detail

> Requested > Submitted > Failed Reconciliation > Preliminary Reconciliation > Final Reconciliation > Statements Created > Deal Created > Active > Completed (Rejected)

Workflow Details

| | | | | |
|---|---|---|---|---|
| Lender: | Deal ID: | Type: | Settlement Date | Loan Count | Excess Servicing Fee |
| Countrywide Home Loans | 1 | ARM | 07/01/2006 | 323,323 | $234,234,675.04 |
| Loan Level Discrepancies | 0 | | | | |
| Pseudo Pool Reconciliation | 0 | | | | |
| Excess Fee Discrepancy | $323,433.32 | | | | |

Submit | Edit | Create Deal | Create PDS | Cancel

1710

| Detail | Files | Reports | Monthly | Activity | Comments | Rules |

| Attribute | Commingling Rule |
|---|---|
| ☑ Amortization Term | Original Terms <= 360 Months or Original Terms >= 361 Months |
| ☑ Assumability | All loans assumable or all loans non-assumable |
| ☐ Convertibility | All loans convertible or all loans non-assumable |
| ☑ Due Date | All loans due on the 1st of the month or other dates |
| ☑ Index | All loans must have the same index and same index source |

Save | Cancel

*Fig. 17*

Excess Servicing Securitization

| Home | Reports | Admin |

Workflow Detail

> Requested >> Submitted >> Failed Reconciliation >> Preliminary Reconciliation >> Final Reconciliation >> Statements Created >> Deal Created >> Active >

Workflow Details

| Lender: | Deal ID: | Type: | Settlement Date | Loan Count | Excess Servicing Fee |
|---|---|---|---|---|---|
| Countrywide Home Loans | 1 | ARM | 07/01/2006 | 323,323 | $234,234,675.04 |
| Loan Level Discrepancies | 0 | | | | |
| Pseudo Pool Reconciliation | 0 | | | | |
| Excess Fee Discrepancy | $323,433.32 | | | | |

[ Submit ] [ Edit ] [ Create Deal ] [ Create PDS ] [ Cancel ]

[ Detail ] [ Files ] [ Reports ] [ Commingling ] [ Monthly ] [ PDS ] [ Activity ] [ Next Rate ] [ Comments ] [ Geo ] [ Rules ]

— 1810

[ Lenders ] [ Loans ]

Pseudo Pools Data

[ Filter ] [ Reset ] Records: Search Results: 500 Filter Results: 500 Show [ 10 ▼ ] Per Page Pages: 1 2 3 4 5 6 Next Last

| Class | ▼ | Pseudo Pool | State | | Rule | Failure |
|---|---|---|---|---|---|---|
| Class: | 1 | | | | Assumability | 230 - True 10 - False |
| Pseudo Pool: | 1A | | | Blah | asdfasdf | asfasd |
| State: | Failed | | | | asdfasdf | asdfaf |
| Failed Rules: | 4 | | | | | asdfasdf |
| | | | | | | — 1820 |
| Class: | 1 | | | | [ Rule ] [ Failure ] | |
| Pseudo Pool: | 1B | | | | | |
| State: | Commingled | | | | | |
| Failed Rules: | 0 | | | | | |

*Fig. 18*

Excess Servicing Securitization

| Home | Reports | Admin |

Workflow Detail

> Requested > Submitted > Failed Reconciliation > Preliminary Reconciliation > Final Reconciliation > Statements Created > Deal Created > Active > Completed (Rejected)

Workflow Details

| Lender: | Countrywide Home Loans | Deal ID: | 1 | Type: | ARM | Settlement Date | Loan Count | Excess Servicing Fee |
|---|---|---|---|---|---|---|---|---|
| | | | | | | 07/01/2006 | 323,323 | $234,234,675.04 |

Loan Level Discrepancies 0
Pseudo Pool Reconciliation 0
Excess Fee Discrepancy $323,433.32

[ Submit ] [ Edit ] [ Create Deal ] [ Create PDS ] [ Cancel ]

1910

| Detail | Files | Reports | Monthly | Activity | Comments | Rules |

State Change History

| Action | UserID | Date |
|---|---|---|
| State changed to Requested | gautae | 07/01/2006 11:00 PM |
| State changed to Submitted | sxupjb | 07/02/2006 11:00 PM |
| State changed to Calculated | gaught | 07/02/2006 11:00 PM |
| State changed to Rejected | sxu | 07/03/2006 11:00 PM |
| State changed to Submitted | gautae | 07/03/2006 11:00 PM |
| State changed to Calculated | gautae | 07/03/2006 11:00 PM |

Activity

| Type | Action | | UserID | Date |
|---|---|---|---|---|
| User | Upload loan level data | | gautae | 07/13/2006 07:00 PM |
| User | Upload target services | | gautae | 07/13/2006 07:00 PM |
| User | Upload target allocation | | gautae | 07/13/2006 07:00 PM |
| User | Approved | | gautae | 07/13/2006 07:00 PM |
| Batch | Perform calculations | | xxadmp | 07/13/2006 07:00 PM |
| User | Upload target allocation | | gautae | 07/13/2006 07:00 PM |
| Batch | Perform calculation | | gautae | 07/13/2006 07:00 PM |
| Batch | Perform calculations | | gautae | 07/13/2006 07:00 PM |

*Fig. 19A*

Excess Servicing Securitization

Control View Window Help

| Home | Reports | Admin |

Workflow Detail

Requested 〉 Submitted 〉 Failed Reconciliation 〉 Preliminary Reconciliation 〉 Final Reconciliation 〉 Statements Created 〉 Deal Created 〉 Active 〉 Completed (Rejected)

Workflow Details

| Lender: | Countrywide Home Loans | Deal ID: | 1 | Type: | ARM | Settlement Date | 07/01/2006 | Loan Count | 323,323 | Excess Servicing Fee | $234,234,675.04 |
|---|---|---|---|---|---|---|---|---|---|---|---|
| Loan Level Discrepancies | | | 0 | | | | | | | | |
| Pseudo Pool Reconciliation | | | 0 | | | | | | | | |
| Excess Fee Discrepancy | | $323,433.32 | | | | | | | | | |

Submit | Edit | Create Deal | Create PDS | Cancel

— 1920

Detail | Files | Reports | Monthly | Activity | Comments | Rules

Monthly Reposting History

| Month | Date | Laser Extract Received | Super Loan File Created |
|---|---|---|---|
| 5 | 07/01/2006 | 07/013/2006 07:00 PM | 07/013/2006 07:00 PM |
| 4 | 06/01/2006 | 06/013/2006 07:00 PM | 06/013/2006 07:00 PM |
| 3 | 05/01/2006 | 05/013/2006 07:00 PM | 05/013/2006 07:00 PM |
| 2 | 04/01/2006 | 04/013/2006 07:00 PM | 04/013/2006 07:00 PM |
| 1 | 03/01/2006 | 03/013/2006 07:00 PM | 03/013/2006 07:00 PM |

PORTAL TOOL AND METHOD FOR SECURITIZING EXCESS SERVICING FEES

CROSS-REFERENCE TO RELATED PATENT APPLICATIONS

This application is a continuation-in-part of U.S. Ser. No. 11/726,364 entitled "Mortgage Securitization System and Method filed on Mar. 21, 2007, which claims the benefit of (i) U.S. Prov. Ser. No. 60/784,726, filed on Mar. 22, 2006, entitled, "Mortgage Securitization System and Method," and (ii) U.S. Prov. Ser. No. 60/889,210 titled "Mortgage Securitization System and Method" filed on Feb. 9, 2007, the disclosures of which are hereby expressly incorporated by reference in their entirety. This application also claims the benefit of U.S. Prov. Ser. No. 60/889,210 titled "Mortgage Securitization System and Method" filed on Feb. 9, 2007, the disclosure of which is hereby expressly incorporated by reference in its entirety.

TECHNICAL FIELD

The present application relates generally to the field of mortgage-related investments. More specifically, the present application relates to communication portals for mortgage backed securities.

BACKGROUND

Introduction of the mortgage backed security (MBS) has made the dream of owning a home possible for a much larger number of individuals. Frequently, when a borrower takes out a loan to purchase a home, that loan is subsequently pooled with other loans and used to create an MBS. The MBS is an investment instrument that can be sold to investors in the global capital markets. Upon sale of the MBS, lenders can turn around and make new loans using proceeds from the sale. In effect, the MBS is a way for the global capital markets to provide capital for loans to fund home ownership. The increased availability of capital reduces interest rates as compared to the interest rates that would otherwise be available, and therefore makes home ownership more affordable for an increased number of individuals.

While the mortgage backed security approach has worked exceptionally well, home ownership rates could be further improved if new forms of mortgage backed securities could be created that more optimally align with investor needs. A more optimal alignment would result in further increases in the availability of capital, further reductions in interest rates, lower cost mortgages, and ultimately increased home ownership rates. Additionally, it is desirable to have tools to support the creation and maintenance of mortgage backed securities through the cooperation of lenders, investors, loan servicers and others. Although certain needs are described herein, it should be understood that the techniques described and claimed herein may also be applied to meet other needs instead of or in addition to the above needs.

SUMMARY

One embodiment of the invention relates a computer-implemented communication portal configured to communicate information regarding mortgage backed securities that have cash flows backed only by excess servicing fees of a plurality of adjustable rate mortgages. The communication portal is configured to provide a user interface that includes displays configured to receive and provide information regarding the excess servicing fees and facilitate reconciliation of the plurality of adjustable rate mortgages. The communication portal is also configured to provide reports regarding the mortgage backed securities that have cash flows backed only by excess servicing fees of the plurality of adjustable rate mortgages.

BRIEF DESCRIPTION OF THE DRAWINGS

The exemplary embodiments will hereafter be described with reference to the accompanying drawings, wherein like numerals denote like elements.

FIG. 4C is a schematic illustrations of data elements reported by reporting logic in accordance with an exemplary embodiment

FIG. 7 is a data chart for two MBS pooling structures in accordance with an exemplary embodiment.

FIGS. 10-20 are screenshots of a tool that may be used to reconcile the data shown in FIGS. 4A-4C.

DETAILED DESCRIPTION

Figure 1:
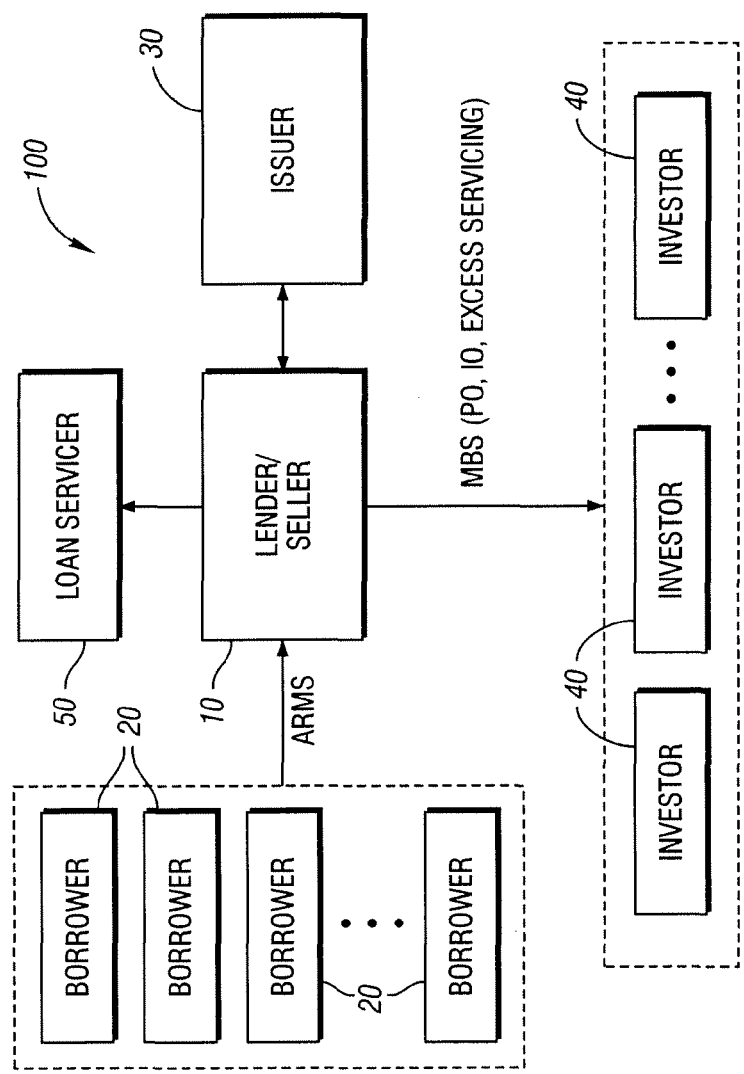
FIG. 1 is a block diagram showing a securitization process in accordance with an exemplary embodiment.

Referring to FIG. 1, in an exemplary embodiment a lender 10 makes a plurality of adjustable rate mortgage (ARM) loans with a plurality of borrowers 20. The lender sells the loans to an issuer 30. In FIG. 1, the transaction is shown as an MBS execution 100, in which the loans are sold to issuer 30 in exchange for mortgage backed securities (MBS). The mortgage backed securities provide the lender with a liquid asset that may be sold to investors 40. In such a scenario, the issuer may also act as a guarantor, by guaranteeing the timely payment of principal and interest of the mortgage loans by the borrowers 20, and receiving a guarantee fee ("g-fee") in exchange for this service. The sale transaction may also be in the form of a cash execution, in which the loans are sold to the issuer 30 in exchange for cash, and the investor may sell MBS backed by the loans to investors. Herein, the term "issuer" is used to generically refer to entity 30 which pools loans into mortgage backed securities, regardless of whether the mortgage backed securities are provided to a lender as part of an MBS execution with the lender or sold directly to investors.

Also shown in FIG. 1 is a loan servicer 50. Throughout the course of each loan, the loan servicer 50 manages the mortgage payment process, including the routine collection of monthly payments from borrowers, transferring principal and to investors, reporting on payment activity, overseeing escrow accounts, and handling delinquency foreclosure problems that may arise. Payments are applied to the loan account and any late fees and/or penalties are adjudicated by the loan servicer 50. The loan servicer 50 receives a servicing fee ("s-fee") in exchange for this service. The servicing fee may be fixed or it may vary over the course of the loan. Excess servicing fees result when the interest rate paid by the borrower on a mortgage, after deducting the interest rate paid to the owner of the mortgages and any guarantee fees, exceeds the normal servicing fee rate.

As shown in FIG. 1, the MBS provided to the lender may include multiple classes, including a principal only (PO) class, an interest only (IO) class, and excess servicing fees class. Other classes may also be included. Investors in the PO class receive cash flow derived from principal payments made on the loans. Investors in the class receive cash flow derived from interest payments made on the loans. Investors in the excess servicing class receive cash flow derived from excess servicing fees. Mortgage backed securities which separate principal and interest payments from underlying mortgage-backed securities (MBS) and offer the discrete pieces to investors as principal only (PO) or interest only (IO) securities are sometimes referred to as stripped mortgage backed securities (SMBS). In such an arrangement, the lender/servicer may swap the servicing income to SMBS issuer in exchange for SMBS backed by the servicing cash flow. The SMBS certificate is backed by either fixed rate or a weighted average number of basis points of the servicing income cash flow over the life of the loan. The underlying collateral for a IO SMBS may be limited to loans in existing mortgage backed securities (MBS). For a particular SMBS, the legal documents may include: Commitment Letter, Fee Reduction Letter, Assignment of Excess Yield, SMBS Prospectus, SMBS Preliminary Data Statement, Opinion of General Counsel of SMBS issuer, Opinion of In House Counsel/Servicer, Opinion(s) of Outside Counsel/Servicer, Dealer Confidentiality Agreement(s), and a Final Data Statement.

The ARM Stripped MBS execution 100 of FIG. 1 offers lenders a way to monetize excess servicing fees and reduce MSR risk, i.e., the risk associated with mortgage servicing rights (MSR). ARM excess servicing fees are used as collateral for the security instrument. Excess servicing may be securitized on a weighted average or stated margin basis.

Figure 2:
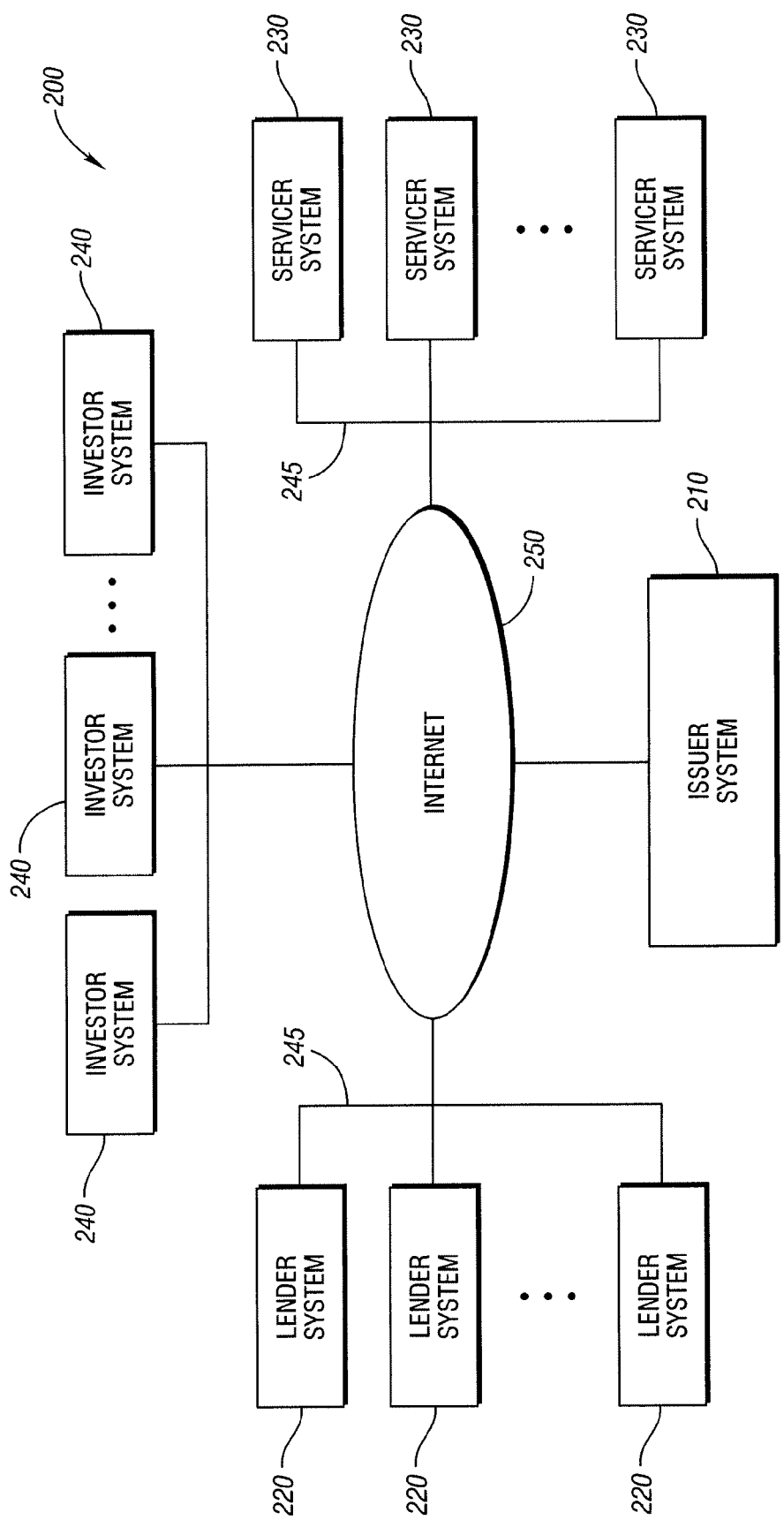
FIG. 2 is a block diagram showing a computer system configured to provide a communication portal according to an exemplary embodiment.

With reference to FIG. 2, a computer system 200 is provided that includes an issuer system 210 associated with issuer 30, lender systems 220 associated with lenders/sellers 10, servicer systems 230 associated with servicers 50, and investor systems associated with investors 40. The issuer system 30 is configured to execute instructions for generating a communication portal. The communication portal facilitates communication between the issuer system 210, lender system 220 and servicer system 230 regarding the SMBS. The network 245 is provided via the Internet 250. Any other communication network may also be used. System users can provide and receive information regarding the income received from the excess servicing fees from a plurality of adjustable rate mortgage loans.

Figure 3:
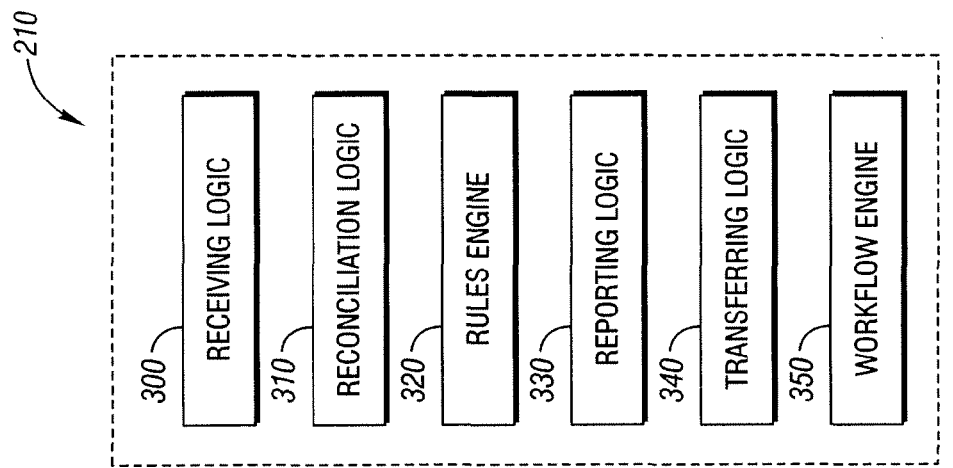
FIG. 3 is a schematic illustration of a data processing system with securitization logic in accordance with an exemplary embodiment.

With reference to FIG. 3, the issuer system 210 is shown in greater detail. The issuer system 210 is a data processing system is usable to create and manage securities in accordance with the securitization process 100 described above with reference to FIG. 1. Several computer systems (e.g., lender systems 220, servicer systems 230, and investor systems 240) may participate in the securitization process 100 or otherwise interact with the issuer system 210. Each system transfers information from a local database over a network, e.g., the Internet, to the issuer system 210.

The issuer system 210 includes receiving logic 300, reconciliation logic 310, rules engine 320, reporting logic 330, and transferring logic 340. Receiving logic 300 acquires loan information and stores such information in a database (not shown) for record keeping. Such loan information may include, for example, information regarding loan interest rates, original principal balance, unpaid principal balance, servicing fees, excess servicing fees, guarantee fees, private mortgage insurance, penalties, other borrower paid fees, default, servicer advances and servicer recoveries.

Reconciliation logic 310 compares loan data from the lender 10 with loan data from the issuer 30 for a group of loans being pooled into a mortgage-backed security. As will be appreciated, lender 10 and issuer 30 may each have their own set of loan data for the ARMs that are being securitized. For example, the lender may deliver the ARMs to the issuer 30 and it may be some time later before the ARMs are pooled into MBS. Accordingly, in the intervening time period, discrepancies in the data may arise or may be detected which need to be reconciled. Reconciling the loan data may involve, for example, comparing a loan data element in the loan data from the lender 10 with the corresponding loan data element in the loan data from the issuer 30 and determining whether any discrepancies exist. Any such discrepancies may then, for example, be manually reconciled.

Figure 4A:
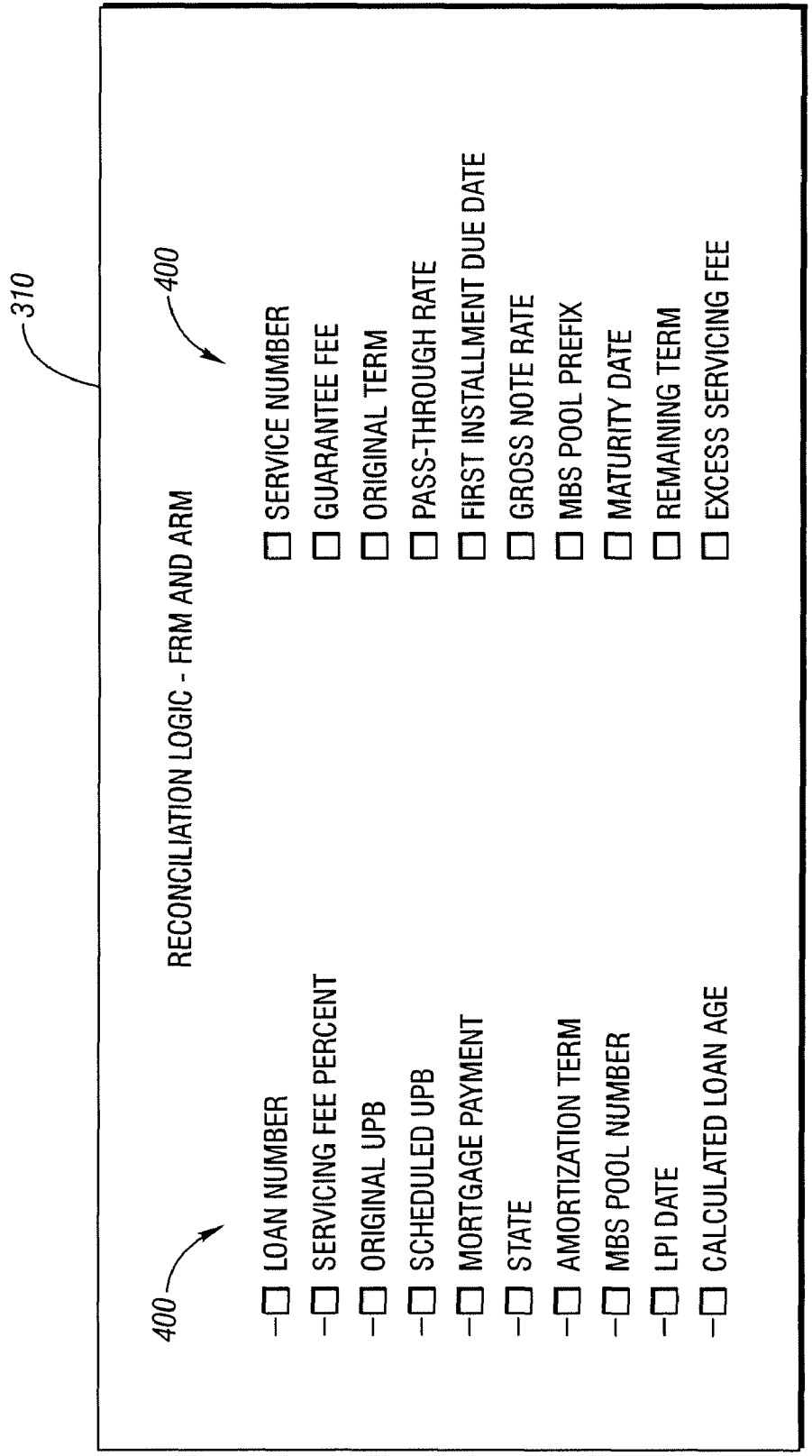
FIGS. 4A-4B are schematic illustrations of data elements compared by reconciliation logic in accordance with an exemplary embodiment.
Figure 4B:
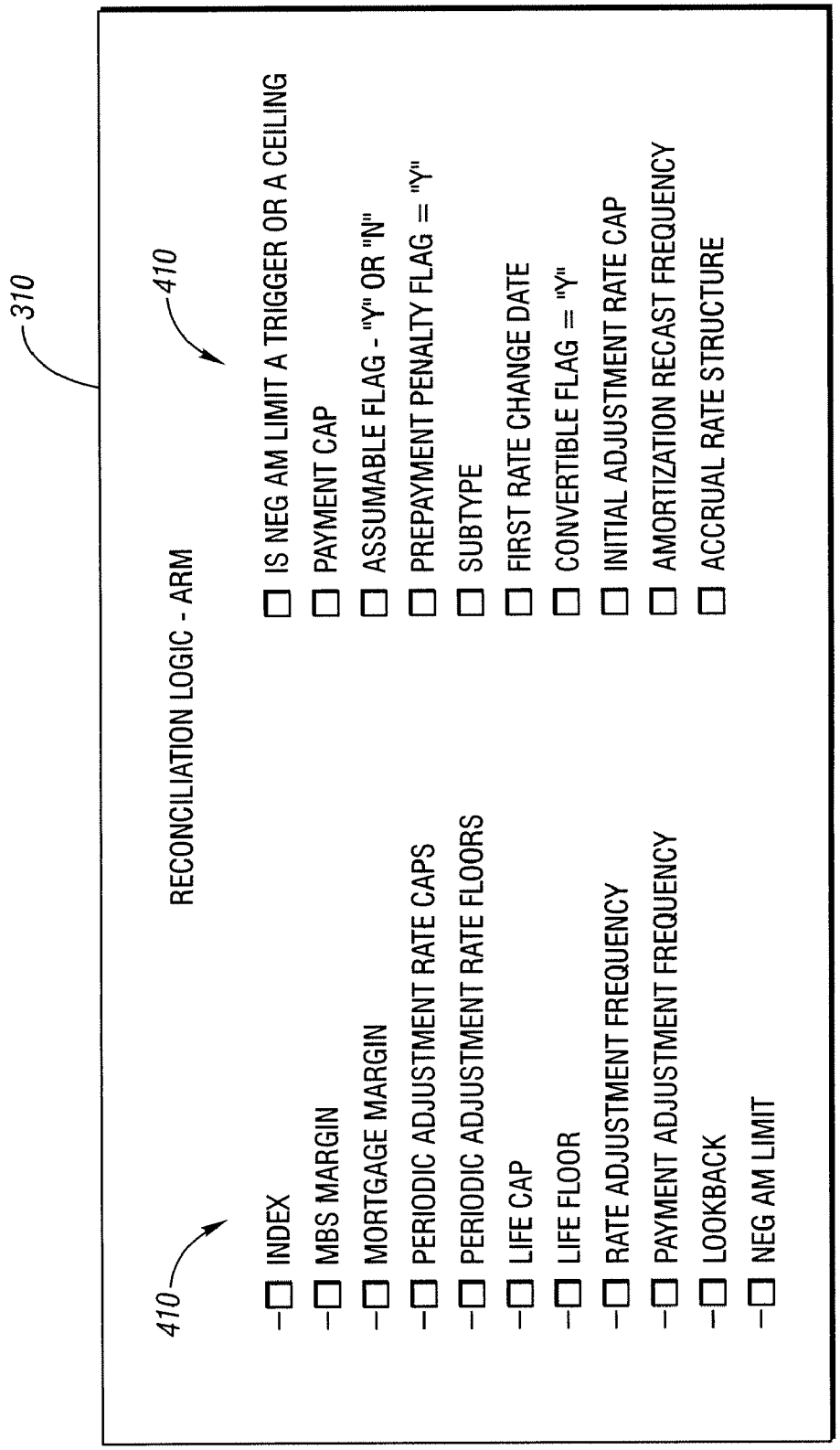

FIGS. 4A-4B are schematic illustrations of loan data examined by reconciliation logic 310 in accordance with an exemplary embodiment. The loan data that is examined may include loan data 400 (FIG. 4A) for parameters that are associated with a variety of types of mortgages and loan data 410 (FIG. 4B) for parameters that are associated with adjustable rate mortgages. For example, the loan data 400 may include loan number, servicing fee percentage, original unpaid principal balance, scheduled unpaid principal balance, mortgage payment, state in which the property is located, amortization term, MBS pool number, LPI (or last paid installment) date, calculated loan age, servicer number, guaranty fee, original term, pass-through rate, first installment due date, gross note rate, MBS pool prefix, maturity date, remaining term, excess servicing fee, and so on. The loan data 400 may include index, MBS margin, mortgage margin, periodic adjustment rate caps, periodic adjustment rate floors, life cap, life floor, rate adjustment frequency, payment adjustment frequency, lookback date (interest and payment), net coupon, negative amortization limit, negative amortization limit trigger or ceiling, payment cap, assumable flags, prepayment penalty flag, subtype, first rate change date, convertible flag, interest rate cap (initial and subsequent), amortization recast frequency, months-to-roll, introductory interest rate, initial monthly payment, date of adjustment, rate change frequency, convertibility, rounding method, initial recast, accrual rate structure, reset date, interest only period, prepayment period, conversion features, and so on. As will be appreciated, a greater or lesser number of parameters or different parameters may also be examined and reconciled.

Referring now to FIG. 4C, periodic disclosures 420 regarding loan status with respect to various loan characteristics are shown. The disclosures may include indexes, rate adjustment frequency, payment adjustment frequency, lookback status, first rate change date, loan convertibility, accrual rate structure, transfer type, rate difference flag, weighted average negative amortization limit, low & high values for MBS margin, accrual net coupon, interest rate as well original loan-to-value amount. The disclosures are made monthly and reported to the issuer. The disclosures may be made more or less frequently and do not necessarily have to occur periodically. As will be appreciated, a greater or lesser number of disclosures or different parameters may also be examined.

Figures 5, 6A, 6B:
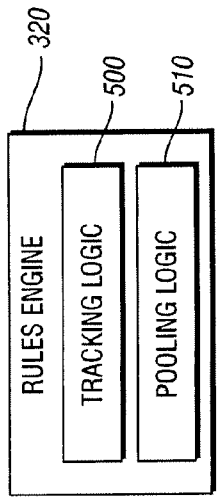
FIG. 5 is a schematic illustration of a rules engine employing tracking logic and pooling logic used in a data processing system in accordance with an exemplary embodiment.
FIG. 6A is a data chart for a pooling structure with variable MBS margins in accordance with an exemplary embodiment.
FIG. 6B is a data chart for a pooling structure with fixed MBS margins in accordance with an exemplary embodiment.

Referring again to FIG. 3, rules engine 320 facilitates pooling by analyzing loan characteristics of the ARMs against a set of predetermined criteria. The predetermined criteria may define, for example, parameters of the types of loans that may be pooled and/or may be included in a particular pool. For example, a mortgage may have a servicing fee structure that makes the mortgage ineligible to be included in the particular pool that is being created. The loan may then be returned to the lender or included in a different MBS pool. With reference to FIG. 5, FIG. 5 shows the rules engine 320 in greater detail. As shown in FIG. 5, rules engine 320 includes tracking logic 500 and pooling logic 510. Tracking logic 500 tracks the allocation of excess servicing between classes to ensure that exactly 100% of the excess servicing is allocated when aggregated at the deal level. Pooling logic 510 implements other rules to ensure the eligibility of loans to be included in particular pool structures, to implement co-mingling rules, and so on. In one embodiment, the loans are included in the MBS pool only if all the loan characteristics meet the predetermined checks performed by the rules engine 320. In one embodiment, to facilitate ARM disclosure and foster liquidity in ARM Strip structures, the pooling logic 510 implements comingling guidelines in which each ARM Strip Class contains homogenous ARM product types. For example, in any one strip class the following are the same: Subtype, Lookback—Interest Rate, Lookback—Payment, Dues dates per class are either "1$^{st}$" or "other due dates" (#), Rounding Method (narrative), Original Term (#mos), Minimum Required Servicing Fee (%), Initial Recast (# mos), Subsequent Recasts (#), Amortization Recast Frequency (#), Negative Amortization Limit (#), Interest Only Loans (Y/N), Interest Only Period (Y/N), Prepayment Premium Period (Y/N).

Referring again to FIG. 3, reporting logic 330 manages investor reporting in connection with the mortgage-backed securities. Reporting logic 330 is configured to generate the monthly disclosures (discussed above) concerning the performance of adjustable rate mortgages. Workflow engine 350 manages workflow associated with the creation and maintenance of MBS, including initial and monthly reconciliation of data.

Referring now to FIGS. 6A-8, pooling arrangements according to exemplary embodiments are shown. In FIGS. 6A-6B, first and second ARM pooling structures 600 and 610 are schematically represented. The first ARM pooling structure 600, in FIG. 6A, is a weighted-average pool formed of a number of loans (e.g., loan A, loan B and loan C as shown in FIGS. 6A-6B). For weighted-average pools, a fixed servicing fee is selected for each loan. The fixed servicing fee is 0.5% for loan pool 600. Each loan has a fixed servicing fee (s-fee) and a fixed guaranty fee (g-fee); however, each loan has a different loan margin or mortgage margin. The loan margin or mortgage margin is the extra portion of interest spread above the ARM index that the borrower pays as part of the ARM loan's mortgage interest rate. The mortgage margin is generally constant over the life of the mortgage loan. The servicing fee and guaranty fee are subtracted from the loan margin to arrive at a loan-level MBS margin. For an MBS, the MBS margin represents an extra yield over the ARM index that an MBS investor receives from the security. In the illustrated embodiment of FIG. 6A, the MBS margin for pool 600 varies because the servicing fee is fixed and the loan margins are different for each loan. As shown in FIG. 6A, the loans A, B, and C each have excess servicing fees of 12.5 basis points (or 0.125%). The excess servicing fee is assumed to be fixed over the life of the loan. In other embodiments, the excess servicing fee may vary over the life of the loan.

The second ARM pooling structure 600, in FIG. 6, is a weighted structure, fixed margin pool formed of loans D, E and F. For fixed margin pools, with a fixed MBS margin. For each loan, the fixed guaranty fee and the servicing fee are subtracted from a fixed MBS margin. The MBS margin is based on the lowest loan margin minus the guaranty fee and minus the servicing fee. The servicing fee varies in the fixed MBS margin pool 810. The loans D, E and F have excess servicing fees of 15 basis points, 40 basis points, and 65 basis points, respectively. The weighted pool average of unpaid principal balance for pool 610 is $500,000.00 and the weighted average excess servicing fee is 0.39% or 39 basis points. Therefore, the MBS yield for pool 610 is approximately $1938.00 for the excess servicing fees in the first year if merely annually compounded. The weighted average excess servicing fee is fixed at 0.125% or 12.5 basis points and the MBS yield for pool 600 is approximately $625 for the excess servicing fees in the first year if annually compounded. Therefore, the yield for excess servicing fees in pool 610 is higher than those in pool 600.

In FIG. 7, the packaging of the cash flows from the loans into various securities are shown for the pooling structures 600 and 610 of FIGS. 6A-6B, respectively. For pooling structure 600, each of the loans A, B and C has the same excess servicing fee of 0.125% or 12.5 basis points. The excess servicing fees are packaged into a single fixed class security which uses 100% of the excess servicing fees for each loan. A fixed class MBS is a class in which each loan in the pool contributes the same number of basis points of excess servicing fee.

For pooling structure 610, four classes of securities are created. The four classes include three fixed classes 1, 2, and 3 as well as one weighted-average coupon (WAC) class. A WAC class is a class in which each loan in the pseudo-pool may contribute a different number of basis points of excess servicing fee. For the WAC class, the weighted average coupon is the weighted average of the gross interest rates of mortgages underlying a pool as of the pool issue date; the unpaid principal balance of each mortgage is used as the weighting factor. The excess servicing fees are packaged into multiple classes of securities which use 100% of the excess servicing fees for each loan. A loan may be in more than one pseudo pool but is not represented for more than 100% of its eligible servicing income (any excess beyond minimum required servicing less any lender-paid mortgage insurance (LPMI)). The examples in FIGS. 6A-8 assume no lender-paid mortgage insurance.

In an exemplary embodiment, ARM loans are already pooled in an ARM MBS that has been issued prior to the month that the ARM strip is issued. In an exemplary embodiment, any amount of excess servicing that occurs once the margin becomes effective can be stripped once the ARM loan reaches its adjustment period.

Figure 8:
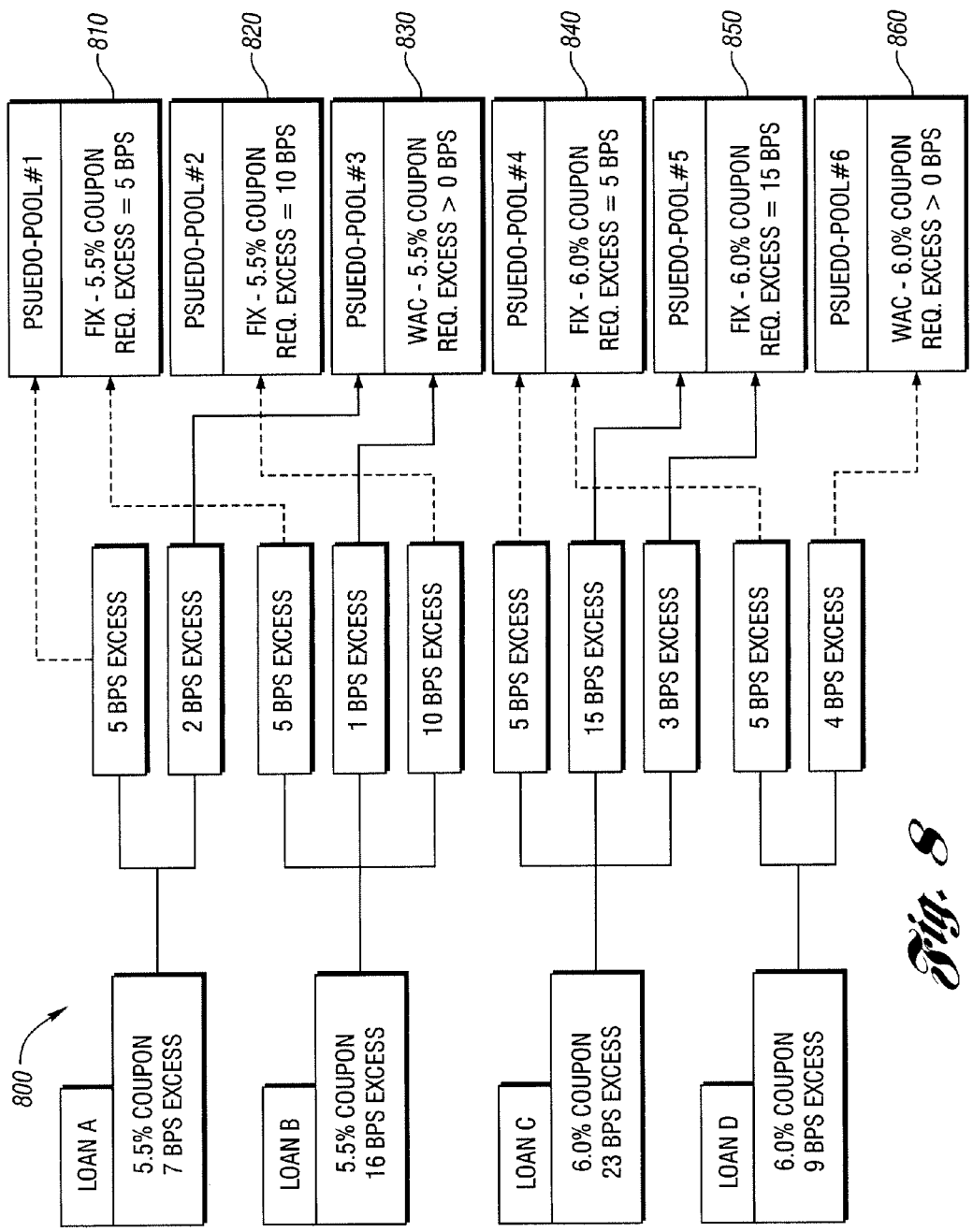
FIG. 8 is a block diagram of a number of loans securitized according to loan basis points in accordance with an exemplary embodiment.

Referring now to FIG. 8, another example of a pooling arrangement 800 is shown according to an exemplary embodiment. In FIG. 8, multiple pools 810, 820, 830, 840, 850 and 860 are shown. Pools 810, 820 and 830 are formed of 5.5% coupon loans. Pool 810 is a fixed 5.5% coupon pool with a required excess servicing fee of 5 basis points. Loans A and B allocate 5 basis points to pool 810. Pool 820 is a fixed 5.5% coupon pool with a required excess of 10 basis points. Loan B allocates 10 basis points to pool 820. Pool 830 is a weighted-average coupon pool which receives residual allocations of 2 basis points and 1 basis point, respectively, from loans A and B. Thus, the excess servicing fees are packaged into multiple classes of securities which use 100% of the excess servicing fees for each loan.

Pools 840, 850 and 860 are formed of 6.0% coupon loans. Pool 840 is a fixed 6.0% coupon pool with a required excess servicing fee of 5 basis points. Each of loans C and D allocates 5 basis points to pool 740. Pool 850 is a fixed 6.0% coupon pool with a required excess of 15 basis points. Loan C allocates 15 basis points to pool 850. Pool 860 is a WAC pool which receives residual allocations of 3 basis points and 4 basis points, respectively, from loans C and D. Thus, the excess servicing fees for pools 840, 850 and 860 are packaged into multiple classes of securities which use 100% of the excess servicing fees for each loan.

Figure 9:
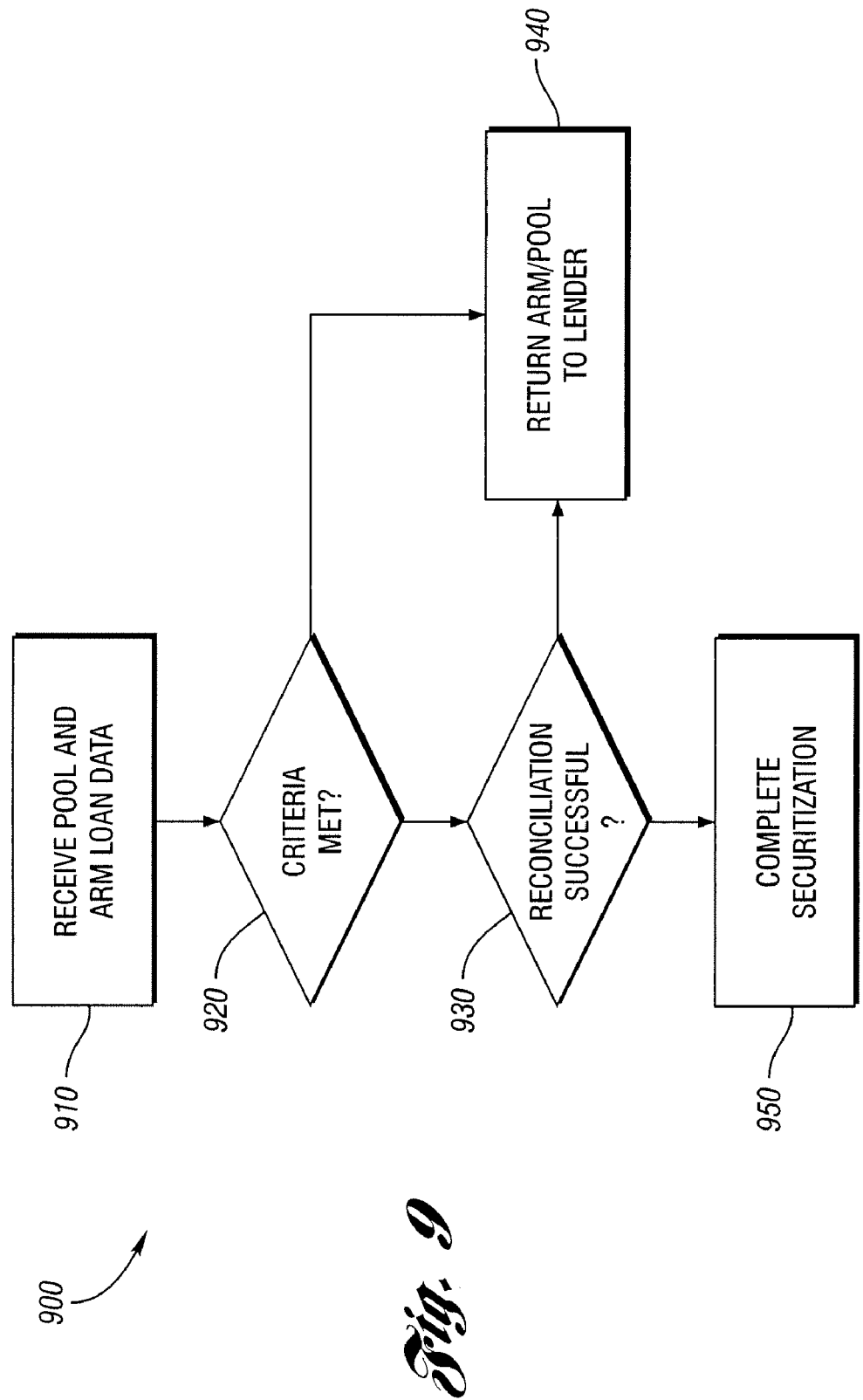
FIG. 9 is a flowchart illustrating a method for issuing and processing mortgages, in accordance with an exemplary embodiment.

Referring now to FIG. 9, a method 900 of creating and managing securities backed by a plurality of adjustable rate mortgages is shown. At step 910, pool and loan data for adjustable rate mortgages is received, e.g., from the lender 10. Information concerning a proposed pooling structure for the adjustable rate mortgages may also be received from the lender. At step 920, it is determined whether the proposed pool structure and the associated adjustable rate mortgages meet various criteria such as eligibility criteria, co-mingling rules, and so on, as described above. At step 930, the loan data received from the lender 10 is reconciled with loan data maintained by the issuer 30. At step 940, if the proposed pool structure does not meet the predetermined criteria, or if discrepancies exist in the data from the lender, then the pool structure and/or individual ARMs are returned for the lender for correction. Step 930 may be repeated as needed to check all predetermined loan characteristics. Once everything is in order, the securitization process is completed at step 950.

To create the MBS described herein, the techniques described in U.S. Pat. No. 6,999,942, entitled "User Interface System and Method for Configuring Cash Flow Processing," issued Feb. 14, 2006, the disclosure of which is hereby incorporated by reference in its entirety, may be used. The disclosure of U.S. 2004/0128229 A1, entitled "System and Method for Processing Data Pertaining to Financial Assets," filed Dec. 30, 2002, published Jul. 1, 2004, cited therein, is also hereby incorporated by reference in its entirety.

After the MBS are created, reconciliation of lender data and issuer data concerning the MBS and the underlying loans, both initially and on a periodic (e.g., monthly) basis, may be desirable. FIGS. 4A-C show examples of data that may be reconciled. In an exemplary embodiment, all of the data shown is reconciled. In other embodiments, less than all of the data shown is reconciled. Any combination or sub-combination of the data shown may be reconciled. The data shown in FIG. 4C may be reported to investors on a monthly basis and/or reconciled with data maintained by the lender. The teachings of U.S. 2004/0225597 A1, entitled "System and Method for Processing Data Pertaining to Financial Assets," filed Dec. 17, 2003, published Nov. 11, 2004, is hereby incorporated in its entirety in this regard. Additionally, the receiving logic 300, reconciliation logic 310, rules engine 320, reporting logic 330 and transferring logic 340 described herein with respect to FIG. 3 may also be used in the creation and maintenance of the MBS.

Referring now to FIGS. 10-20, in an exemplary embodiment, an on-line portal tool or communication portal is provided that facilitates the creation and maintenance of MBS backed by excess servicing fees. FIGS. 10-20 show screen shots of web pages that may be provided in connection with such a tool. The web pages may be provided by a web server or other computer that is operated by the issuer as part of issuer system 210. The tool may also be accessed by lenders 10 and servicers 50 through a communication network, such as the Internet.

Lenders may use the portal tool to upload loan level data for loans used to create the MBS. For example, lenders may access the portal tool through a home page and may use the portal tool to submit deal requests and view the status of such requests. Lenders may also use the portal tool to download discrepancy reports showing loan level data to be reconciled, and to facilitate the reconciliation of such data. Servicers may use the portal tool for reconciliation that occurs on a monthly basis. The issuer may use the portal tool to manage deal processing workflows and reconciliation until the MBS is created and on an ongoing basis for monthly reconciliation.

In one embodiment, the portal tool is configured in generally the same manner for different users spanning different entities, with each specific user being provided with views of only certain data. For example, a user associated with a specific lender may only be provided with information concerning deals associated with that specific lender, whereas a user associated with the issuer may be provided with information concerning deals associated with multiple lenders. Thus, while certain screens below may be described in the context of a lender or an issuer, it will be appreciated that the same or similar screens may also be provided to users at other types of entities.

Figure 10:
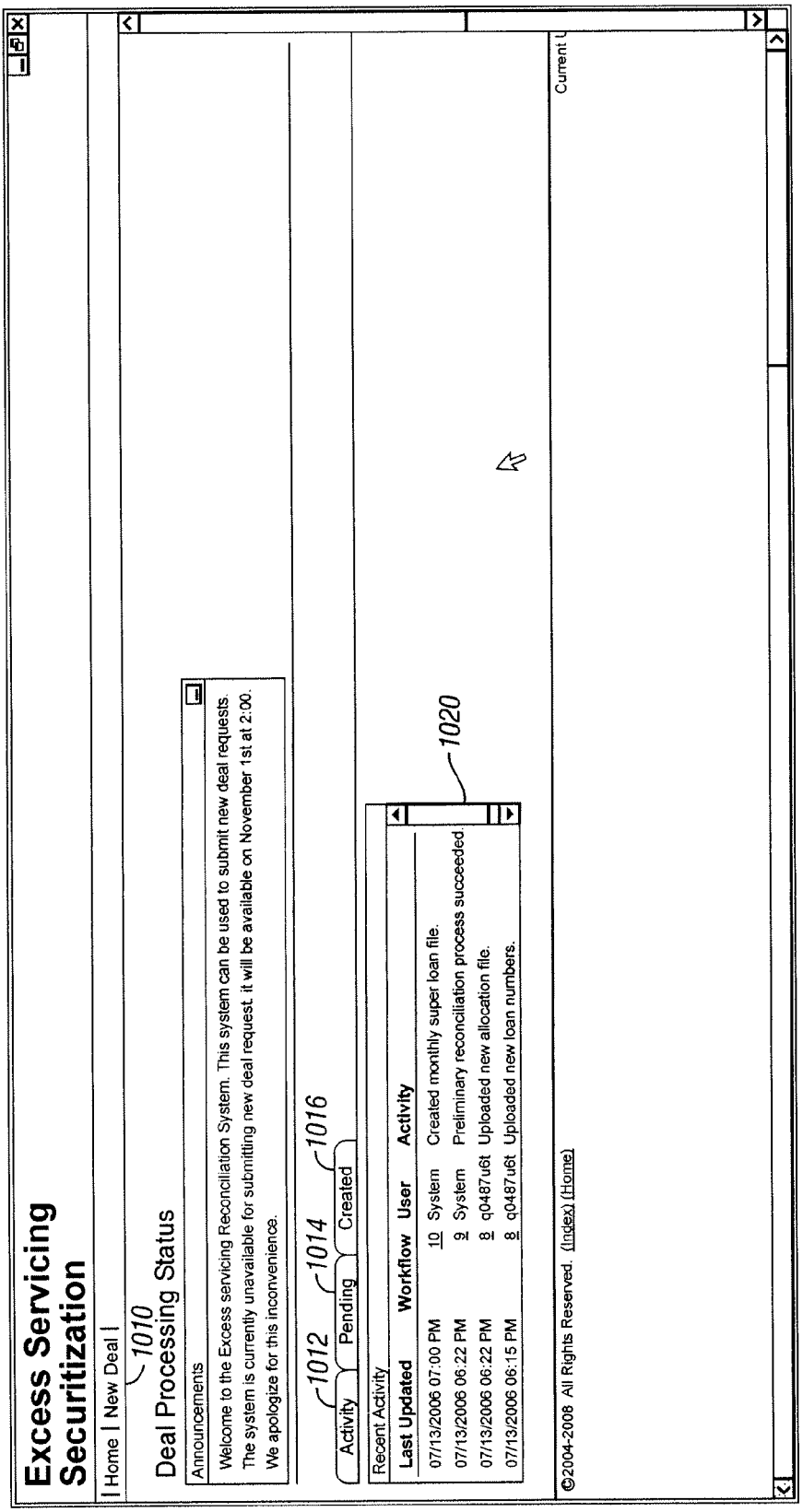

Referring first to FIG. 10, a screen that may be provided to a lender after login is shown. As shown in FIG. 10, a new deal button 1010 may be selected by the user to initiate the creation of a new deal. Also shown are three tabs 1012, 1014 and 1016. Activity tab 1012 shows all of the lender's activities that have been performed on the system. Pending tab 1014 shows all deals being processed and not yet completed. Created tab 1016 shows all deals that have been submitted for completion or that have been completed. In FIG. 10, the activity tab has been selected, and the status of various activities is shown within a window 1020. The status of the activities may be tracked by a workflow engine 350.

Referring now to FIG. 11, FIG. 11 is similar to FIG. 10 except that the pending tab 1014 has been selected. In the example of FIG. 11, two pending deals are shown. By clicking one of the links 1110, the user can drill down on one of the two pending deals to perform further operations and analysis. In the example of FIG. 11, the user is provided with information regarding discrepancies in loan level data in comment field 1112. The user may then select link 1110 for that loan to obtain additional details.

Referring now to FIG. 12, FIG. 12 is similar to FIG. 10 except that the created tab 1016 has been selected. In FIG. 12, information concerning various deals is shown in window 1210. Such information includes information concerning loan level discrepancies (column 1212), pseudopool reconciliation (column 1214) and excess fee discrepancies (column 1216). By selecting a link 1218 associated with a specific one of the deals, the user may be taken to a screen showing workflow detail and other information for that deal. Referring now to FIG. 13, FIG. 13 shows a screen that provides workflow detail and other information for a specific deal, e.g., responsive to the deal being selected such as through one of the links 1218 in FIG. 12. In FIG. 13, in window 1310, the user is provided with various workflow details, such as information concerning loan level discrepancies (field 1312), pseudopool reconciliation (field 1314) and excess fee discrepancies (field 1316). In the example screen of FIG. 13, the lenders tab 1330 has been selected. Lenders tab 1330 lists all the servicer numbers included in the data file from the lender.

The portal tool is configured to facilitate loan level reconciliation, pseudopool reconciliation, and excess fee discrepancies. With regard to loan level reconciliation, the portal tool may be used to facilitate loan level data between data maintained by the issuer system and data maintained by the lender's system. Loan level data from the lender may be uploaded by the lender using files tab 1320 (see FIGS. 14A-14B).

Figure 15:
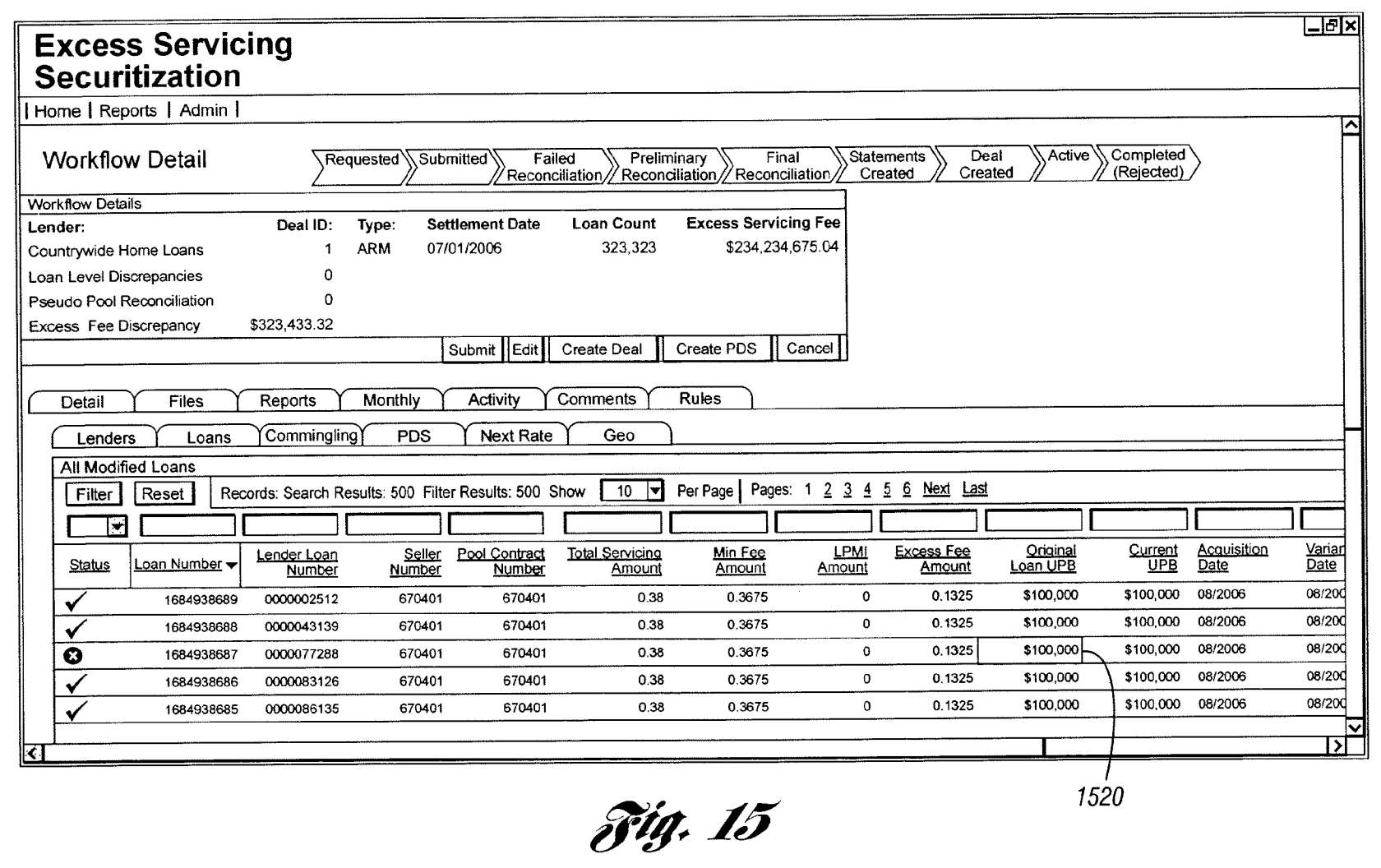

Referring now also to FIG. 15, FIG. 15 shows a screen in which loans tab 1332 has been selected. The system may show unmatched loans (e.g., in the issuer data and not in the lender data) and reconciled loans. All data elements reconciled at the loan level are provided for each reconciled loan, along with a status (e.g., matched or unmatched). In FIG. 15, one of the data elements is highlighted (field 1520), indicating a mismatch.

Various reports may be generated showing results of the loan level reconciliation. For example, a loan reconciliation result report may be generated which identifies all discrepancies for each impacted loan and will provide the lender loan number, the associated issuer loan number, data field impacted, the value from the lender's file, and the data from the issuer system. Likewise, a lender loan mismatch report may be generated which lists lender and issuer loan numbers included in the lender's loan data file that do not appear in the issuer data. As another example, a loan extract problems report may be generated which shows any data that is not valid (e.g., the value for next payment change date is "999999" and not a date format). Such reports may be posted in the portal tool and available for download by the lender through reports tab 1610 (see FIG. 16).

Pseudopool reconciliation is performed to test the pooled loans for compliance with comingling rules implemented in the pooling logic 510 of rules engine 320. Typically, there may be specific comingling rules associated with each pseudopool. The portal tool implements a pseudopool reconciliation process to ensure that all loans within a pseudopool meet the comingling requirements. Upon completion of the pseudopool reconciliation, the portal tool creates a comingling reconciliation report which shows the results of the reconciliation process. The report may be organized by pseudopool, and may list all the rules, and the value provided for each loan on the allocation file for every rule. FIG. 17 shows a screen accessed through rules tab 1710 that may be used to edit rules applied during the pseudopool reconciliation process.

With reference to FIG. 18, FIG. 18 is similar to FIG. 13 except that the comingling tab 1810 has been selected. Window 1820 shows multiple comingling rules that have been executed by rules engine 320 and the results of each test.

Excess servicing fee reconciliation is performed by the portal tool to validate that the amount of stripped excess contributed by each loan in the lender's allocation file equals the amount of excess servicing available for each loan in the issuer system. The excess servicing fee reconciliation process is run one time in the deal settlement month, after both the loan level and pseudopool reconciliation files result in zero errors (considered final files). An excess servicing fee report is generated that lists all the lender loan numbers to be included in the transaction and the associated issuer loan number, and for each loan, the excess servicing fee value and the total stripped excess servicing fee for each loan on the allocation file. (A loan may be in more than one pseudopool on the allocation file. The total stripped excess amount is computed per loan by adding up the amount of excess per pseudopool.)

Based on the above-described reports that are provided, the lender may review its data in an effort to reconcile its data with the data of the issuer. Once discrepancies are identified, the lender may resolve the source of the discrepancy, and submit a new reconciliation request. With each reconciliation request, an updated loan level file may be submitted by the lender, and another iteration of the reconciliation process may be performed with regard to the updated loan level file. The reconciliation process may occur multiple times in a month. As also indicated, the reconciliation may also be performed on an ongoing basis, that is, it may be performed both reconciliation for initial eligibility and validation activities (FIGS. 4A-4B) and to support reconciliation of monthly payment data (FIG. 4C) in connection with monthly disclosures to investors. FIGS. 19A and 19B show screen displays available through tabs 1910 and 1912 summarizing this activity.

Figure 20:
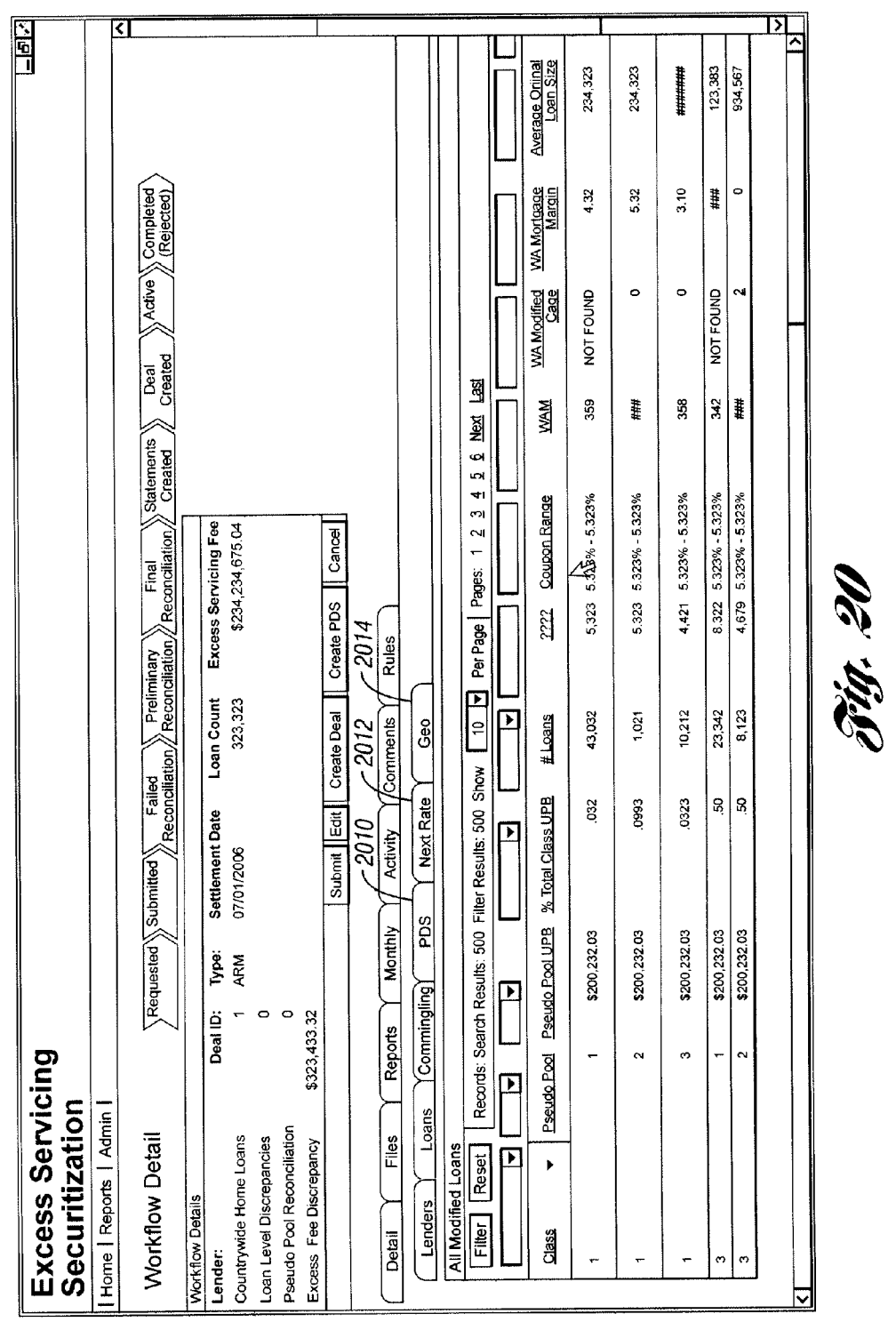

Referring now to FIG. 20, after reconciliation during deal settlement month is complete, a preliminary data statement (PDS) may be posted. The PDS is at-issuance disclosure documentation that may be posted, for example, to the internet approximately one week before deal settlement. FIG. 20 is similar to FIG. 13 except that PDS tab 2010 has been selected. The PDS tab displays pseudopool level attributes, including: class number, pseudopool number, coupon type, loan count, total scheduled upaid principal balance (UPB), weigthed average (WA) mortgage margin, WA GNR, WA remaining term, WA minimum servicing fee, and WA excess servicing fee. An export button will allow users to obtain the data in either an Excel file or text file. In the deal settlement month, the day that the final loan level and pseudopool reconciliations are received (zero discrepancies), and when the excess servicing fee reconciliation has zero discrepancies, the rollup process begins.

Additional tabs 2012 and 2014 may also be provided to access tabular information associated with the PDS. For example, next rate tab 2012 may provide tabular information including information regarding the pseudopools per class, the loans in each pseudopool, the next rate change date for each loan in each pseudo pool, groupings of loans in each pseudopool by the next rate change date, and various other information for each next rate change date grouping (e.g., % of pseudopool UPB; loan count; mortgage interest rate—low, high, and weighted average; mortgage margin—low, high, and weighted average; mortgage life cap—low, high, and weighted average; mortgage life floor—low, high, and weighted average), and so on. Likewise, geo tab 2014 may provide a list of states included in each pseudopool. For example, for each pseudopool, the geo tab 2014 may provide information including an associated class number, pseudopool number, state(s), % of pseudopool UPB (for each state listed), prepay term if applicable (acceptable values are 3-year, 5-year or N/A), and so on.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function.

The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computer-implemented system for processing information regarding mortgage backed securities that have incoming cash flows backed only by the excess servicing fees of the plurality of adjustable rate mortgages, the computer-implemented system comprising:
   a computer processor; and
   a computer-readable storage medium having instructions stored therein, the instructions being executable by the computer processor to generate a user interface, wherein user interface is configured to:
   receive a plurality of information regarding the plurality of adjustable rate mortgages, the plurality of adjustable rate mortgages pooled into mortgage backed securities having income cash flows only from excess servicing fees associated with the plurality of adjustable rate mortgages, wherein each adjustable rate mortgage in the plurality of adjustable rate mortgages contributes equal number of basis points of excess service fee;
   receive reconciliation information regarding the plurality of adjustable rate mortgage loans, wherein the reconciliation information includes comparisons of loan data with respect to predetermined criteria, the loan data including loan type, interest rate, loan margin, guarantee fee, servicing fee, MBS margin and other loan characteristics, the reconciliation information including one or more discrepancies in loan data;

provide a data connection between a number of users, the users including an issuer, lender and loan servicer; and generate a graphical user interface configured to provide a display of information regarding the plurality of adjustable rate mortgage loans, wherein the information may include reconciliation information, loan activity, and income received from the excess servicing fees associated with the plurality of adjustable rate mortgages.

2. The system of claim 1, wherein the user interface further configured to provide information regarding income from the excess servicing fees of the plurality of adjustable rate mortgages.

3. The system of claim 2, wherein the reports include a report of the income received from the excess servicing fees from the plurality of adjustable rate mortgages based on basis points.

4. The system of claim 1, wherein the reconciliation includes applying business rules to loan information for plurality of adjustable rate mortgages, the business rules comparing a first set of loan data received from a lender to a second set of loan data received from an issuer, the first loan data and the second loan data associated with the plurality of adjustable rate mortgages.

5. The computer system of claim 1, wherein the computer system is configured to communicate with a servicer system that provides information regarding the excess servicing fees of the plurality of adjustable rate mortgages.

6. The computer system of claim 1, wherein the adjustable rate mortgage loans are pooled according to loan characteristics and the computer system is configured to provide information with respect to the income of the pooled adjustable rate mortgage loans.

7. The computer system of claim 6, wherein at least one loan characteristic is loan basis points and the computer system is configured to report the income received from the plurality of adjustable rate mortgages based on basis points.

8. The computer system of claim 1, wherein the graphical user interface is configured to display information regarding reconciliation of the plurality of adjustable rate mortgages.

9. The computer system of claim 8, wherein the instructions are executable by the computer processor to implement a rules engine that applies business rules, and wherein the reconciliation includes applying business rules to loan information for the plurality of adjustable rate mortgages.

10. The computer system of claim 1, wherein the graphical user interface is configured to generate user prompts in which loan and/or user information may be entered, the loan information including loan identification, loan type, interest rate, and servicing fees.

11. The computer system of claim 1, wherein the graphical user interface includes web pages available through a website.

12. The computer system of claim 11, wherein the computer system is configured to keep an inventory of websites visited by a user.

13. The computer system of claim 11, wherein the instructions are executable by the computer processor to implement a workflow engine that manages a workflow processes associated with reconciliation of data in connection with the mortgage backed securities, and wherein the website is configured to display information with respect to the workflow process, the information including reconciliation status.

14. The computer system of claim 11, wherein the website is configured to provide information on the status of the plurality of adjustable rate mortgages, the information including loan activity, pendency of loan deals and newly created loan files.

15. The system of claim 1, wherein the user interface further configured to
check the status of the plurality of adjustable rate mortgages with respect to sub servicing; and
display information with respect to loan sub servicing.

16. An online system for facilitating communication regarding securitizing excess servicing fees associated with a plurality of adjustable rate mortgages, wherein the online system is accessible by a plurality of lenders, the online system comprising:
a computer processor that executes instructions;
machine-readable storage medium having the instructions stored therein, the instructions when executed causing a computer to implement:
reconciliation logic configured to compare a first set of loan data received from a lender to a second set of loan data received from an issuer and detect one or more discrepancies between the first set of loan data and the second set of loan data, wherein the first and second sets of loan data include loan type, interest rate, loan margin, guarantee fee, servicing fee, MBS margin and other loan characteristics, and the first loan data and the second loan data associated with the plurality of adjustable rate mortgages;
pooling logic configured to pool the plurality of adjustable rate mortgages into mortgage backed securities, wherein the mortgage backed securities have cash flows backed only by excess servicing fees of the plurality of adjustable rate mortgages;
wherein the online system is configured to receive information regarding the excess servicing fees of the plurality of adjustable rate mortgages, and to process inquiries and generate reports regarding the mortgage backed securities that have cash flows backed only by excess servicing fees of the plurality of adjustable rate mortgages.

17. The online system of claim 16, wherein the online system is configured to provide a display of information regarding the excess servicing fees of the plurality of adjustable rate mortgages.

18. The online system of claim 17, wherein the online system is configured to provide a display of information regarding the income from excess servicing fees.

19. The online system of claim 16, wherein the online system is configured to provide a report of the income received from the plurality of adjustable rate mortgages based on basis points.

20. The online system of claim 16, wherein the online system is configured to provide a display of information regarding reconciliation of the plurality of adjustable rate mortgages from loan servicers, wherein the reconciliation includes applying business rules to loan information for the plurality of adjustable rate mortgages.

* * * * *